United States Patent [19]

Sakamoto

[11] Patent Number: 5,828,801
[45] Date of Patent: Oct. 27, 1998

[54] LIGHT SIGNAL SWITCHING DEVICE AND OPTICAL COMMUNICATION SYSTEM

[75] Inventor: Hiroshi Sakamoto, Kawasaki, Japan

[73] Assignee: Fujitsu Limited, Kawasaki, Japan

[21] Appl. No.: 694,707

[22] Filed: Aug. 9, 1996

[30] Foreign Application Priority Data

Mar. 18, 1996 [JP] Japan ............................ 8-060728

[51] Int. Cl.⁶ ............................................. G02B 6/28
[52] U.S. Cl. .................... 385/24; 385/16; 385/22
[58] Field of Search ............................. 385/24, 16, 20, 385/21, 22; 372/6

[56] References Cited

U.S. PATENT DOCUMENTS

| | | | |
|---|---|---|---|
| 4,778,238 | 10/1988 | Hicks | 372/6 |
| 5,455,704 | 10/1995 | Mizuochi et al. | 372/6 |

*Primary Examiner*—John Ngo

[57] ABSTRACT

In a light signal switching device including an input optical fiber via which a light signal is received. There are provided first and second output optical fibers each being doped with a rare-earth element, first and second pumping sources inputting exciting lights to the first and second output optical fibers, a drive controller driving the first and second pumping sources so that one of the exciting lights is applied to one of the first and second output optical fibers via which the light signal received from the input optical fiber is output.

7 Claims, 10 Drawing Sheets

LIGHT SIGNAL SWITCHING DEVICE AND OPTICAL COMMUNICATION SYSTEM

BACKGROUND OF THE INVENTION

1. Field Of The Invention

The present invention relates a light signal switching device which switches light signals and an optical communication system which utilizes such a light signal switching device.

Light signals enable high-speed transmission, and various optical transmission systems have been practically used. In optical transmission systems, it is necessary to switch transmission routes for light signals. It is desired that a light signal switching device used in such optical transmission systems has a high reliability, a low insertion loss, a low cost and a compact size.

2. Description Of The Related Art

Nowadays, various types of light signal switching devices for switching light signal transmission routes are known. Recently, there has been considerable activity in the development and practicality of devices having no mechanically moving parts. For example, a directional coupler is known in which has a waveguide formed by diffusing Ti or the like into a substrate having an electro-optical effect such as $LiNbO_3$. Also, a Mach-Zehnder type switching device is known. Further, a total reflection type light switch is known which utilizes a change in the refractive index caused by injecting a carrier into a compound semiconductor substrate made of, for example, GaAs.

The above conventional light signal switching devices electrically control the switching operations in order to cut off the light signals and switch the transmission routes in the light transmission systems. Also, a matrix type light signal switching device is known which is provided at crosspoints between optical fibers on the input side and optical fibers on the output side.

As the insertion loss of optical fibers is reduced, the distance between repeaters for repeating the light signals can be increased. Under the above circumstance, an advanced optical transmission system is practically used in which a long-distance transmission path is formed by an optical fiber. Even an underwater cable is formed by an optical fiber. When three remote points are connected together by means of underwater cables, an underwater cable extending from one point branches in two ways directed to the other two remote points. In other words, the underwater cable branches in a T-shaped formation.

A light signal switching device is provided at the T-shaped branching point for switching the transmission routes of the light signals. When a fault occurs, the switching device performs the switching operation on the optical fibers. It is to be noted that the conventional light signal switching devices to be placed in the branch point have a considerable insertion loss, which reduces the light power of the light signals. Hence, it is not possible to provide a long distance between the adjacent repeaters. Further, it is difficult to reduce the dimensions of the conventional switching devices. Thus, the structure of the system including the switching device placed at the branch point is of a large size.

SUMMARY OF THE INVENTION

It is a general object of the present invention to provide a light signal switching device in which the above disadvantages are eliminated.

A more specific object of the present invention is to provide a light signal switching device having a reduced insertion loss and a compact size.

The above objects of the present invention are achieved by a light signal switching device including an input optical fiber via which a light signal is received, the light signal switching device comprising:

first and second output optical fibers each being doped with a rare-earth element;

first and second pumping sources inputting exciting lights to the first and second output optical fibers; and a drive controller driving the first and second pumping sources so that one of the exciting lights is applied to one of the first and second output optical fibers via which the light signal received from the input optical fiber is output.

The light signal may further comprise photocouplers which couple the first and second pumping sources with the first and second output optical fibers.

The above objects of the present invention are also achieved by a light signal switching device including an input optical fiber via which a light signal is received, the light signal switching device comprising:

first and second output optical fibers each being doped with a rare-earth element;

first and second pumping sources inputting exciting lights to the first and second output optical fibers;

a first photocoupler coupling the first and second pumping sources with the input optical fiber;

a second photocoupler coupling the input optical fiber with the first and second output optical fibers;

a first optical filter provided between the second photocoupler and the first output optical fiber;

a second optical filter provided between the second photocoupler and the second output fiber; and a drive controller selectively driving one the first and second pumping sources.

The signal switching device may be configured so that the first and second pumping sources respectively generate the pumping sources of wavelengths $\lambda_1$ and $\lambda_2$, and the first and second optical fibers respectively reject light of wavelengths $\lambda_2$ and $\lambda_1$.

The above objects of the present invention are also achieved by a light signal switching device performing switching among first, second and third routes for transmitting light signals, the light signal switching device comprising:

first photocouplers;

first and second pumping sources provided, via the first photocouplers, to each of input optical fibers respectively forming the first, second and third routes, the first and second pumping sources generating exciting lights of different wavelengths;

second photocouplers provided to each of the input optical fibers;

first and second output optical fibers coupled to the second photocouplers via optical filters, the first and second output optical fibers being doped with a rare-earth element;

third photocouplers coupling the second output optical fibers with the first optical fibers extending in routes different from the routes of the second output optical fibers; and a drive control part which selectively drives the first and second pumping laser sources.

The light signal switching device may be configured so that: the light signal switching device comprises: a remote control part and a branching part;

the remote control part includes the first photocouplers and the first and second pumping sources;

the branching part includes the first and second output optical fibers, the first and second optical filters and the second and third photocouplers; and the remote control part is optically coupled to the branching part.

Another object of the present invention is to provide an optical communication system having a light signal switching device as described above.

This object of the present invention is achieved by an optical transmission system comprising:

first, second and third communication devices;

first photocouplers;

first and second pumping sources provided, via the first photocouplers, to each of input optical fibers respectively extending from the first, second and third communication devices, the first and second pumping sources generating exciting lights of different wavelengths;

second photocouplers provided to each of the input optical fibers;

first and second output optical fibers coupled to the second photocouplers via optical filters, the first and second output optical fibers being doped with a rare-earth element;

third photocouplers coupling the second output optical fibers with the first optical fibers extending to communication devices different from those of the second output optical fibers; and a drive control part which selectively drives the first and second pumping laser sources.

The optical transmission system may comprise a remote control part and a branching part, the remote control part including the first photocouplers and the first and second pumping sources, the branching part including the first and second output optical fibers, the first and second optical filters and the second and third photocouplers. The branching part is provided so as to accommodate the input optical fibers extending from the first, second and third communication devices. The remote control part is provided in one of the first, second and third communication devices and is optically coupled to the branching part.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
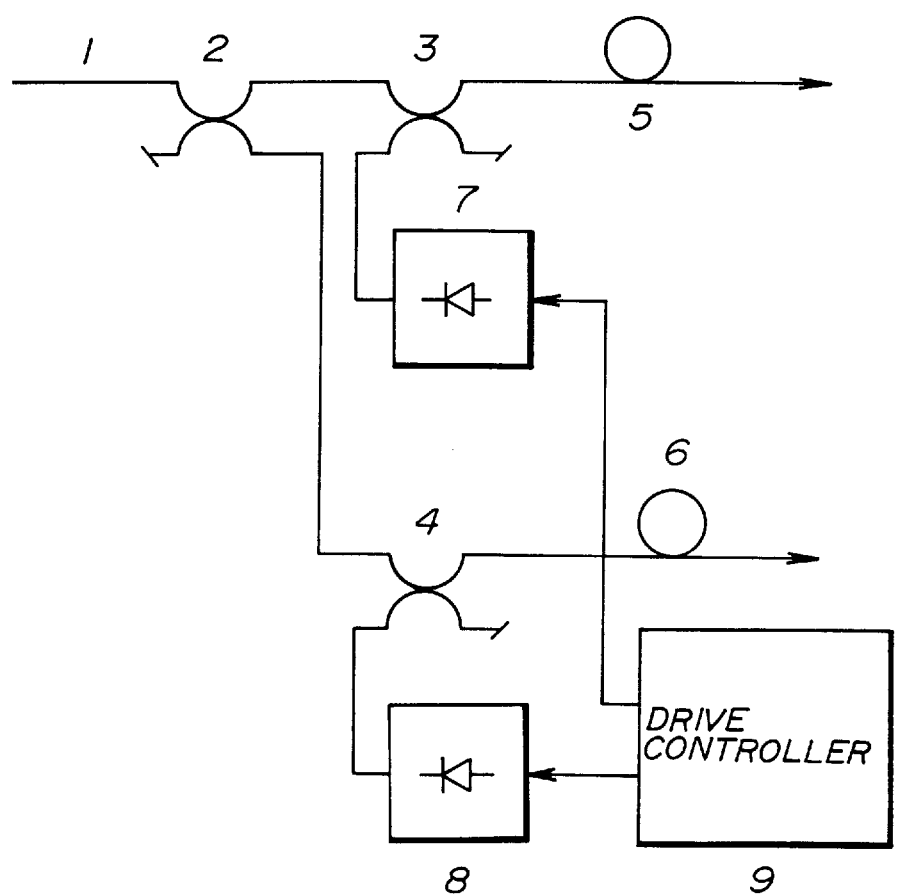
FIG. 1 is a diagram of a first embodiment of the present invention.

FIG. 1 is a block diagram of a light signal switching device according to a first embodiment of the present invention. The switching device shown in FIG. 1 is connected to an input optical fiber 1, and first and second output optical fibers 5 and 6, which are rare-earth-element doped optical fibers. The switching device includes photocouplers 2, 3 and 4, first and second pumping laser light sources 7 and 8, and a drive controller 9.

The photocoupler 2 corresponds to a branching filter at which a light signal from the input optical fiber 1 branches into output signals propagating through the output optical fibers 5 and 6. The photocouplers 3 and 4, which correspond to wave combiners, are used to input exciting light (also referred to as excitation light) from the pumping laser light sources 7 and 8 to the output optical fibers 5 and 6, which are rare-earth-element doped optical fibers. The photocouplers 3 and 4 can be formed by conventional photocouplers of, for example, a diffraction lattice type, a dielectric member multilayered film structure type or a distributed coupling type.

The first and second output optical fibers 5 and 6 are fibers doped with erbium (Er), neodymium (Nd), praseodymium (Pr) or the like. Generally, an erbium-doped optical fiber is used as a light amplifier. The Er-doped fiber is capable of providing a gain of tens of dB by pumping a light signal in the 1.55 $\mu$m band by an exciting light of 0.98 $\mu$m or 1.48 $\mu$m.

The first and second pumping laser light sources 7 and 8 are, for example, InGaAs/GaAs semiconductor laser diodes that operate in the 0.98 $\mu$m band, and are, for example, InGaAsP/InP semiconductor laser diodes in the 1.48 $\mu$m band. The drive controller 9 supplies one of the first and second pumping laser light sources 7 and 8 to thereby generate the exciting light.

When the first pumping laser light source 7 is driven by the drive controller 9 and the exciting light generated by the light source 7 is input to the first output optical fiber 5 through the photocoupler 3, the light signal applied through the photocoupler 2 from the input optical fiber 1 is amplified and output. The second pumping laser light source 8 is not driven, and no exciting light is applied to the second output optical fiber 6. The rare-earth-element doped optical fiber has a large loss with respect to light signals close to the wavelength band of the light signal. Hence, the light signal that is input to the second output fiber 6 from the input optical fiber 1 through the photocoupler 2 is greatly attenuated.

For example, if the first output optical fiber 5 amplifies the light signal by approximately 20 dB, the second output optical fiber 6 attenuates the light signal by approximately 20 dB. Hence, the level difference between the output light signals of the first and second optical fibers 5 and 6 is approximately equal to 40 dB. The light signal from the second output optical fiber 6 is negligible, and thus the light signal from the input optical fiber 1 is substantially output from the first output optical fiber 5.

When the driving of the first pumping laser light source 7 is stopped and the second pumping laser light source 8 is driven, the exciting light from the light source 8 is input to the second output optical fiber 6 via the photocoupler 4. Thus, the second output optical fiber 6 amplifies the light signal from the input optical fiber 1. On the other hand, the light signal from the input optical fiber 1 is greatly attenuated by the first output optical fiber 5. Hence, the light signal from the input optical fiber 1 is amplified by the second output optical fiber 6 and is output therefrom. By driving either the first exciting light source 7 or the second exciting light source 8 in the above-mentioned manner, it is possible to provide a switching between the first and second output optical fibers 5 and 6.

Figure 2:
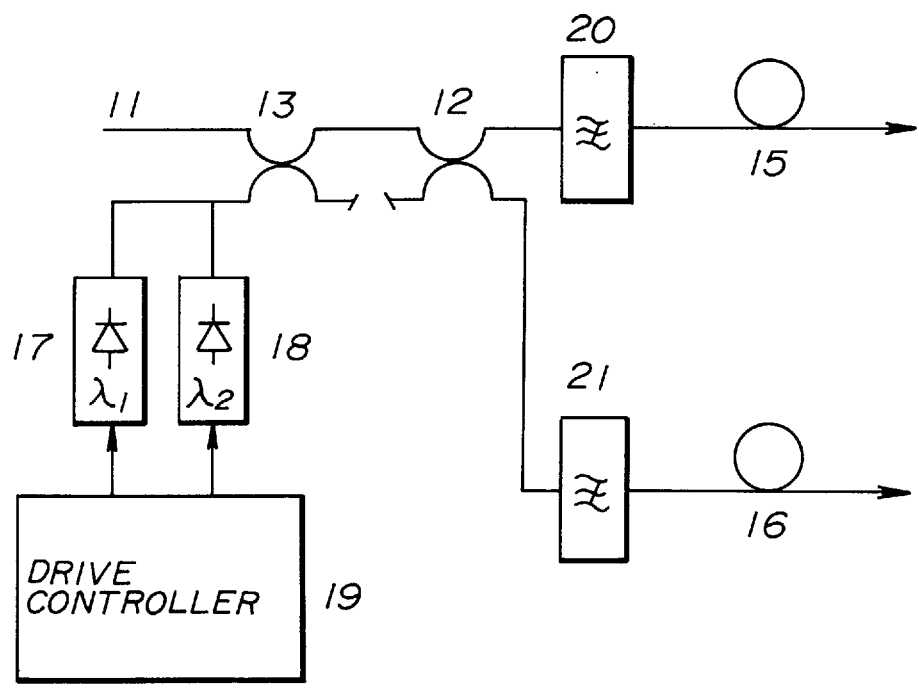
FIG. 2 is a diagram of a second embodiment of the present invention.

A description will now be given, with reference to FIG. 2, of a light signal switching device according to a second embodiment of the present invention. The switching device shown in FIG. 2 is connected to an input optical fiber 11, and first and second output optical fibers. The first and second output optical fibers are rare-earth-element doped optical fibers, such as erbium-doped optical fibers.

The switching device shown in FIG. 2 includes photocouplers 12 and 13, first and second pumping laser light sources 17 and 18, a drive controller 19 and first and second optical filters 20 and 21. The first and second pumping sources 17 and 18 respectively generate exciting light having different wavelengths $\lambda_1$ and $\lambda_2$. The first and second optical filters 20 and 21 respectively have rejection bands with rejection wavelengths $\lambda_1$ and $\lambda_2$. A photocoupler is provided in order to optically couple the first and second pumping sources 17 and 18 with the photocoupler 13 although an illustration thereof is omitted for the sake of simplicity.

The drive controller 19 drives either the first pumping source 17 or the second pumping source 18 in the same manner as the aforementioned drive controller 9. When the wavelength of the light signal which is input from the input optical fiber 11 is equal to 1.55 $\mu$m, the wavelengths $\lambda_1$ and $\lambda_2$ of the exciting lights generated by the first and second pumping sources 17 and 18 are respectively set equal to 1.46 $\mu$m and 1.49 $\mu$m. In this case, the first optical filter 20 functions as a band rejection filter which rejects the wavelength $\lambda_2$ equal to 1.49 $\mu$m from the second pumping source 18, while the second optical filter 21 functions as a band rejection filter which rejects the wavelength $\lambda_1$ equal to 1.46 $\mu$m from the first pumping source 17. The band rejection filter can be a conventional one of a multilayered film structure, for example.

For example, when the first pumping source 17 is driven by the drive controller 19, the 1.46 $\mu$m exciting light is applied to the first and second optical filters 20 and 21 via the photocouplers 13 and 12. The 1.46 $\mu$m exciting light is rejected by the second optical filter 21, and is applied to only the first output optical fiber 15. Hence, the light signal from the input optical fiber 11 is input to the first output optical fiber 15 via the photocouplers 13 and 12 and the first optical filter 20, and is amplified by the fiber 15. The light signal from the input optical fiber 11 applied to the second output optical fiber 16 via the photocouplers 13 and 12 and the second optical filter 21 is greatly attenuated.

When the second pumping source 18 is driven by the drive controller 19, the 1.49 $\mu$m exciting light is applied to the first and second optical filters 20 and 21 via the photocouplers 13 and 12. The 1.49 $\mu$m exciting light is rejected by the first optical filter 20, and is applied to only the second output optical fiber 16. Hence, the light signal from the input optical fiber 11 is input to the second output optical fiber 16 via the photocouplers 13 and 12 and the second optical filter 21, and is amplified by the fiber 16. The light signal from the input optical fiber 11 applied to the first output optical fiber 15 via the photocouplers 13 and 12 and the first optical filter 20 is greatly attenuated. By driving either the first exciting light source 17 or the second exciting light source 18 in the above-mentioned manner, it is possible to provide a switching between the first and second output optical fibers 15 and 16.

It is possible to elongate the optical fiber between the photocouplers 13 and 12. A branching part made up of the components 12, 15, 16, 20 and 21 is controlled by a remote control part made up of the components 13, 17, 18 and 19. The components of the branching part are passive components, and the switching between the transmission routes at the branching part can be remote-controlled by switching between the wavelengths of the exciting light in the remote control part.

Figure 3:
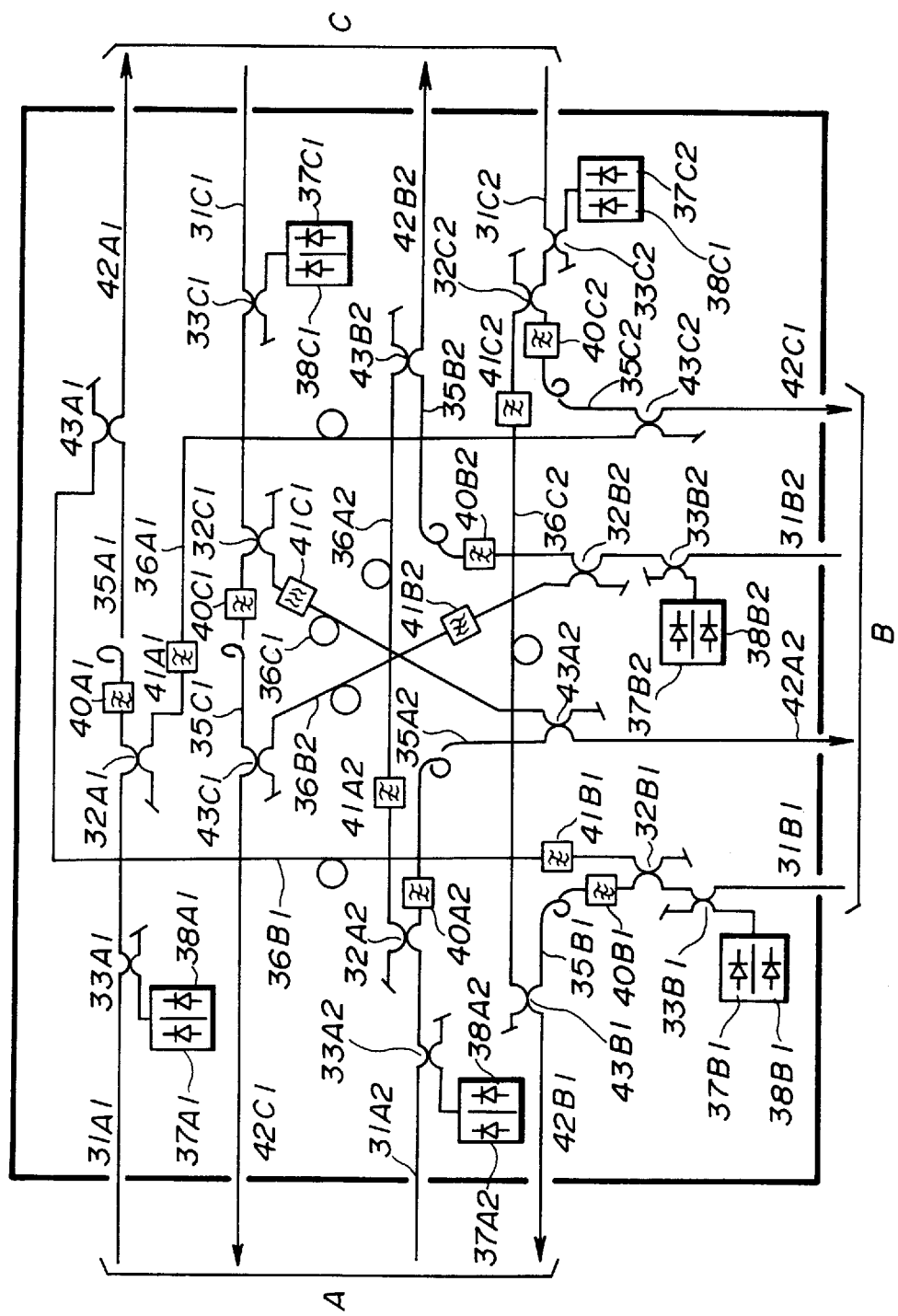
FIG. 3 is a diagram of a third embodiment of the present invention.

A description will now be given, with reference to FIG. 3, of a light signal switching device according to a third embodiment of the present invention. In FIG. 3, symbols A, B and C respectively denote repeaters or terminal stations (communication devices) in an optical transmission system, and symbols 31A1, 31A2, 31B1, 31B2, 31C1 and 31C2 indicate optical fibers, each of which fibers corresponds to the input optical fiber 11 shown in FIG. 2. Symbols 42A1, 42A2, 42B1, 42B2, 42C1 and 42C2 respectively indicate output optical fibers, and symbols 32A1, 32A2, 32B1, 32B2, 32C1 and 32C2 indicate second photocouplers, which correspond to the photocoupler 12 shown in FIG. 2. Symbols 33A1, 33A2, 33B1, 33B2, 33C1 and 33C2 indicate first photocouplers, which correspond to the photocoupler 13 shown in FIG. 2. Symbols 43A1, 43A2, 43B1, 43B2, 43C1 and 43C2 indicate third photocouplers.

Symbols 35A1, 35A2, 35B1, 35B2, 35C1 and 35C2 indicate first output optical fibers doped with a rare-earth element, such as an Er-doped optical fibers. In the following description, the first output optical fibers 35A1, 35A2, 35B1, 35B2, 35C1 and 35C2 are respectively formed of Er-doped optical fibers. The first Er-doped optical fibers 35A1, 35A2, 35B1, 35B2, 35C1 and 35C2 correspond to the first output optical fiber 15 shown in FIG. 2. Symbols 36A1, 36A2, 36B1, 36B2, 36C1 and 36C2 indicate second output optical fibers doped with a rare-earth element, such as an Er-doped optical fibers. In the following description, the second output optical fibers 36A1, 36A2, 36B1, 36B2, 36C1 and 36C2 are respectively formed of Er-doped optical fibers. The second Er-doped optical fibers 36A1, 36A2, 36B1, 36B2, 36C1 and 36C2 correspond to the second output optical fiber 16 shown in FIG. 2. Symbols 37A1, 37A2, 37B1, 37B2, 37C1 and 37C2 indicate first pumping laser light sources such as semiconductor laser diodes outputting exciting lights of the wavelength $\lambda_1$ and correspond to the first pumping laser light source 17 shown in FIG. 2. Symbols 38A1, 38A2, 38B1, 38B2, 38C1 and 38C2 indicate second pumping laser light sources such as semiconductor laser diodes outputting exciting light of the wavelength $\lambda_2$, and correspond to the second pumping laser light source 18 shown in FIG. 2.

Symbols 40A1, 40A2, 40B1, 40B2, 40C1 and 40C2 indicate first optical filters that reject the exciting lights of wavelength $\lambda_2$, and correspond to the first optical filter 20 shown in FIG. 2. Symbols 41A1, 41A2, 41B1, 41B2, 41C1 and 41C2 indicate second optical filters that reject the exciting light of wavelength $\lambda_1$, and correspond to the second optical filter 21 shown in FIG. 2. An illustration of a drive controller corresponding to the drive controller 19 shown in FIG. 2 is omitted for the sake of simplicity. It is possible to provide a drive controller common to the first pumping sources 37A1, 37A2, 37B1, 37B2, 37C1 and 37C2 and second pumping sources 38A1, 38A2, 38B1, 38B2, 38C1 and 38C2.

The repeaters or terminal stations A, B and C are mutually connected via the light signal switching device shown in FIG. 3. The light signal switching device functions as a branching device among the repeaters or terminals stations A, B and C. The first output optical fiber 35A1 coupled to the second photocoupler 32A1 via the first optical filter 40A1 is coupled to the output optical fiber 42A1 via the third photocoupler 43A1. The second Er-doped optical fiber 36A1 coupled to the second photocoupler 32A1 via the optical filter 41A1 is coupled to the output optical fiber 42C1 via the third photocoupler 43C2.

The first Er-doped optical fiber 35A2 coupled to the second photocoupler 32A2 via the first optical filter 40A2 is coupled to the output optical fiber 42A2 via the third photocoupler 43A2. The second Er-doped optical fiber 36A2 coupled to the second photocoupler 32A2 via the second optical filter 41A2 is coupled to the output optical fiber 42B2 via the third photocoupler 43B2.

Regarding the other first and second rare-earth-element doped optical fibers, the inputs and outputs are cross-connected via the second and third photocouplers.

Normally, the first pumping sources 37A1, 37A2, 37B1, 37B2, 37C1 and 37C2 are driven, and the exciting lights of the wavelength $\lambda_1$ is input to the first and second optical filters 40A1, 40A2, 40B1, 40B2, 40C1, 40C2, 41A1, 41A2, 41B1, 41B2, 41C1 and 41C2 via the first photocouplers 33A1, 33A2, 33B1, 33B2, 33C1 and 33C2 and the second photocouplers 32A1, 32A2, 32B1, 32B2, 32C1 and 32C2.

The exciting light of the wavelength $\lambda_1$ passes through the first optical filters 40A1, 40A2, 40B1, 40B2, 40C1 and 40C2, and is input to the first Er-doped optical fibers 35A1, 35A2, 35B1, 35B2, 35C1 and 35C2. On the other hand, the exciting light of the wavelength $\lambda_1$ is rejected by the second optical filters 41A1, 41A2, 41B1, 41B2, 41C1 and 41C2, and is not input to the second Er-doped optical fibers 36A1, 36A2, 36B1, 36B2, 36C1 and 36C2.

Hence, the light signals are amplified by the first Er-doped optical fibers 35A, 35A2, 35B1, 35B2, 35C1 and 35C2, but are attenuated by the second Er-doped optical fibers 36A1, 36A2, 36B1, 36B2, 36C1 and 36C2. Hence, the light signals are transmitted in the following routes among the terminal stations (repeaters) A, B and C:

31A1→35A1→41A1
31A2→35A2→42A2
31B1→35B1→42B1
31B2→35B2→42B2
31C1→35C1→42C1
31C2→35C2→42C2.

Figure 4:
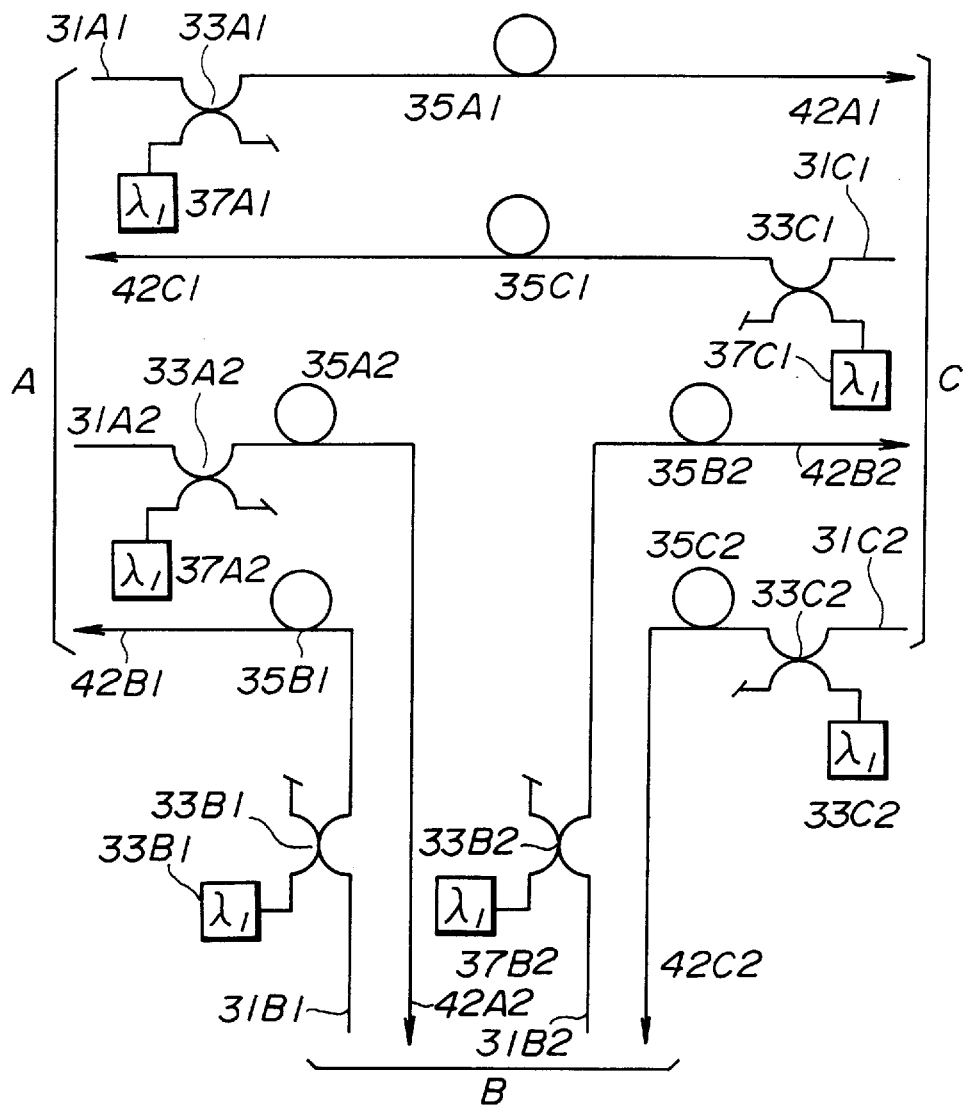
FIG. 4 is a diagram showing a connection which can be established in a normal state by the third embodiment of the present invention.

FIG. 4 shows the above routes established in the normal state.

That is, the light signal input to the input optical fiber 31A1 from the terminal station A and the exciting light of the wavelength $\lambda_1$ from the first pumping source 37A1 are input to the first optical fiber 35A1 via the first photocoupler 33A1. The amplified light signal is transmitted to the terminal station C via the output optical fiber 42A1. The light signal input to the input optical fiber 31C1 from the terminal station C and the exciting light of the wavelength $\lambda_1$ from the first pumping source 37C1 are input to the first Er-doped optical fiber 35C1 via the first photocoupler 33C1. The amplified light signal is transmitted to the terminal station A via the output optical fiber 42C1. In the above manner, the light signal transmission routes among the terminal stations A, B and C can be established.

Similarly, the transmission route between the terminal stations A and B and the transmission route between the terminal station B and C can be established. In this case, the input light signals from the input optical fibers 31A2, 31B1, 31B2 and 31C2 are amplified by the first Er-doped optical fibers 35A2, 35B1, 35B2 and 35C2, and are output via the output optical fibers 42A, 42B1, 42B2 and 42C2.

Figure 5:
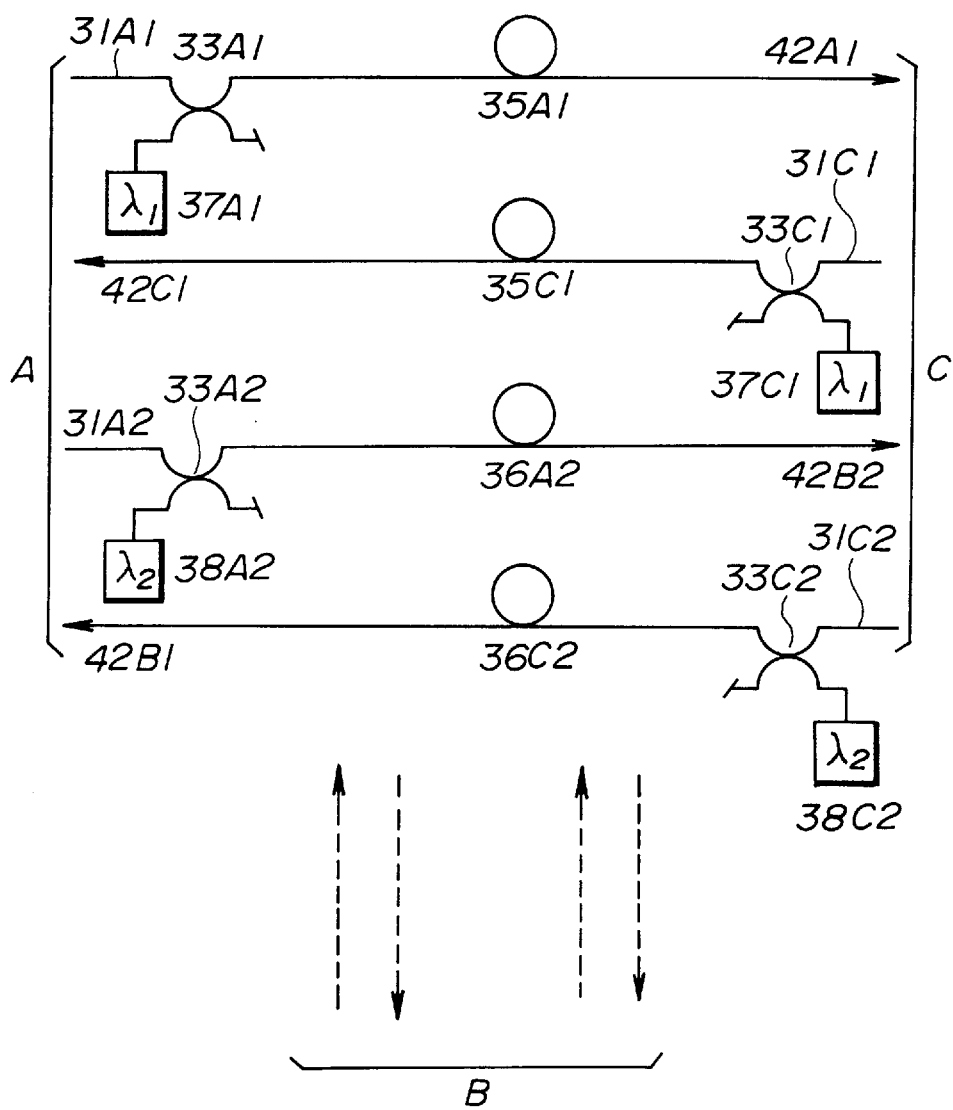
FIG. 5 is a diagram showing a connection which can be established by the third embodiment of the present invention when a fault occurs in a terminal station B.

If a fault occurs at the side of the terminal station B, the light signal transmissions cannot take place between the stations A and B and between the stations C and B. That is, the optical transmission paths between the terminals A and B and between the terminals C and B cannot be used. In order to efficiently utilize the resources, the transmission routes can be switched, as shown in FIG. 5. This switching is directed to increasing the capacity of transmission between the stations A and C.

In this case, the first pumping sources 37A1 and 37C1 and the second pumping sources 38A2 and 38C2 are driven. The exciting light of the wavelength $\lambda_1$ from the first pumping sources 37A1 and 37C1 is input to the first photocouplers 33A1 and 33C1 and the first Er-doped optical fibers 35A1 and 35C1 via the first optical filters shown in FIG. 3 (an illustration thereof is omitted in FIG. 4). The exciting light of the wavelength $\lambda_2$ from the second pumping sources 38A2 and 38C2 is input to the first photocouplers 33A2 and 33C2 and the second Er-doped optical fibers 36A2 and 36C2 via the second optical filters shown in FIG. 3 (an illustration thereof is omitted in FIG. 4).

Hence, the input optical fibers 31A1 and 31C1 and the output optical fibers 42A1 and 42C1 are coupled together via the first Er-doped optical fibers 35A1 and 35C1. The input optical fibers 31A2 and 31C2 and the output optical fibers 42B2 and 42B1 are coupled together via the second Er-doped optical fibers 36A2 and 36C2. The optical transmission paths between the branching device and the station B are in the rest state, and the other optical transmission paths are efficiently utilized. In this case, the input optical fiber 31A2 is switched to the output optical fiber 42B2 from the output optical fiber 42A2, and the input optical fiber 31C2 is switched to the output optical fiber 42B1 from the output optical fiber 42C2.

In the normal state shown in FIG. 4, if a fault occurs at the side of the station C and light signals cannot be transmitted between the stations A and C and between the stations B and C, the operations of the first pumping sources 37A1 and 37B2 are stopped. Instead, the second pumping sources 38A1 and 38B2 are operated. Hence, a state shown in FIG. 6 can be established. That is, the exciting light of the wavelength $\lambda_2$ from the second pumping sources 38A1 and 38B2 is input to the second Er-doped optical fibers 36A1 and 36B2 via the first photocouplers 33A1 and 33B2 and the second optical filters shown in FIG. 3 (an illustration thereof is omitted in FIG. 6).

Hence, the input optical fibers 31A2 and 31B1 and the output optical fibers 42A2 and 42B1 are coupled together via the first Er-doped optical fibers 35A2 and 35B1. The input optical fibers 31A1 and 31B2 are detached from the output optical fibers 42A1 and 42B2, and are connected to the output optical fibers 42C2 and 42C1 via the second Er-doped optical fibers 36A1 and 36B2.

Figure 7:
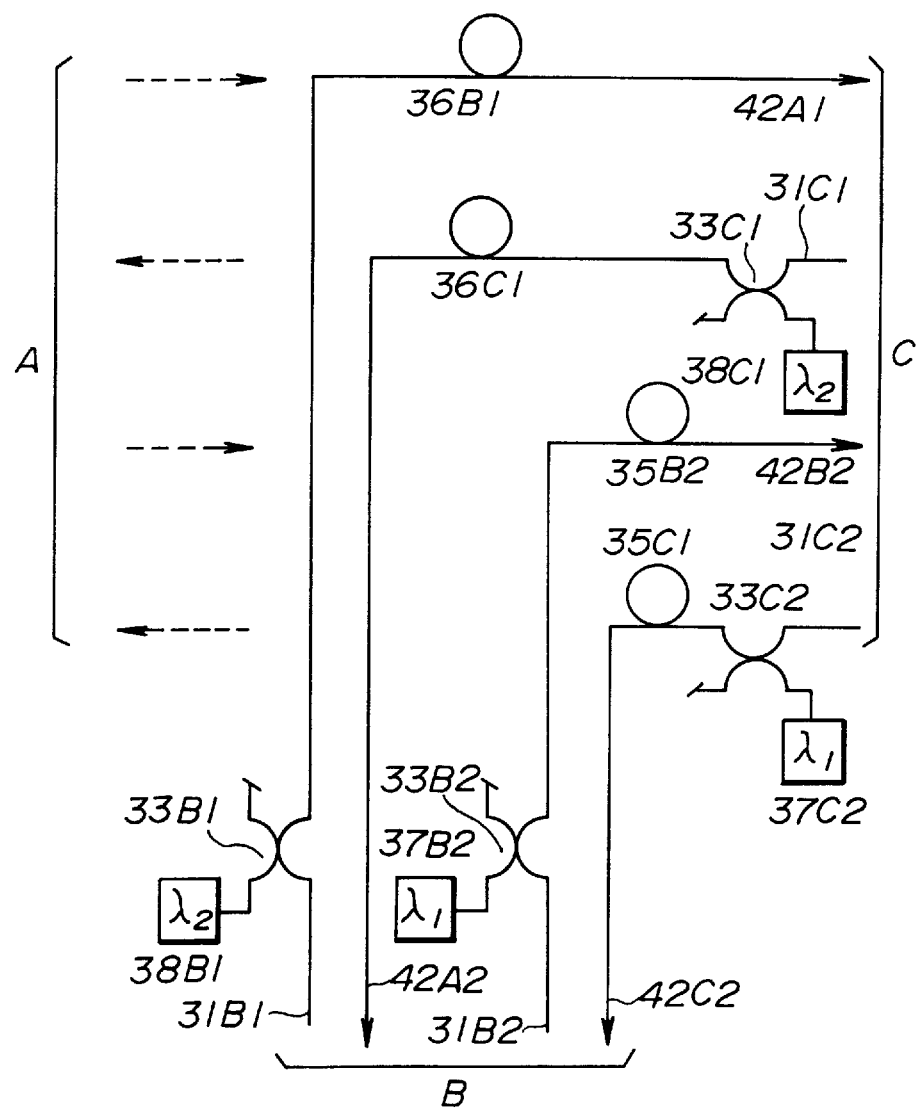
FIG. 7 is a diagram showing a connection which can be established by the third embodiment of the present invention when a fault occurs in a terminal station A.

In the normal state shown in FIG. 4, if a fault occurs at the side of the station A and light signals cannot be transmitted between the stations A and C and between the stations A and B, the operations of the first pumping sources 37B1 and 37C1 are stopped, and instead the second pumping sources 38B1 and 38C1 are operated. Hence, a state shown in FIG. 7 is established. As shown in FIG. 7, the exciting light of the wavelength $\lambda_2$ from the second pumping sources 38B1 and 38C1 is input to the second Er-doped optical fibers 36B1 and 36C1 via the first photocouplers 33B1 and 33C1 and the second optical filters shown in FIG. 3 (an illustration thereof is omitted in FIG. 7).

Hence, the input optical fibers 31B2 and 31C2 and the output optical fibers 42B2 and 42C2 are connected via the first Er-doped optical fibers 35B2 and 35C1. The input optical fibers 31B1 and 31C1 are detached from the output optical fibers 42B1 and 42C1 and are connected to the output optical fibers 42A1 and 42A2 via the second Er-doped optical fibers 36B1 and 36C1.

Figure 8:
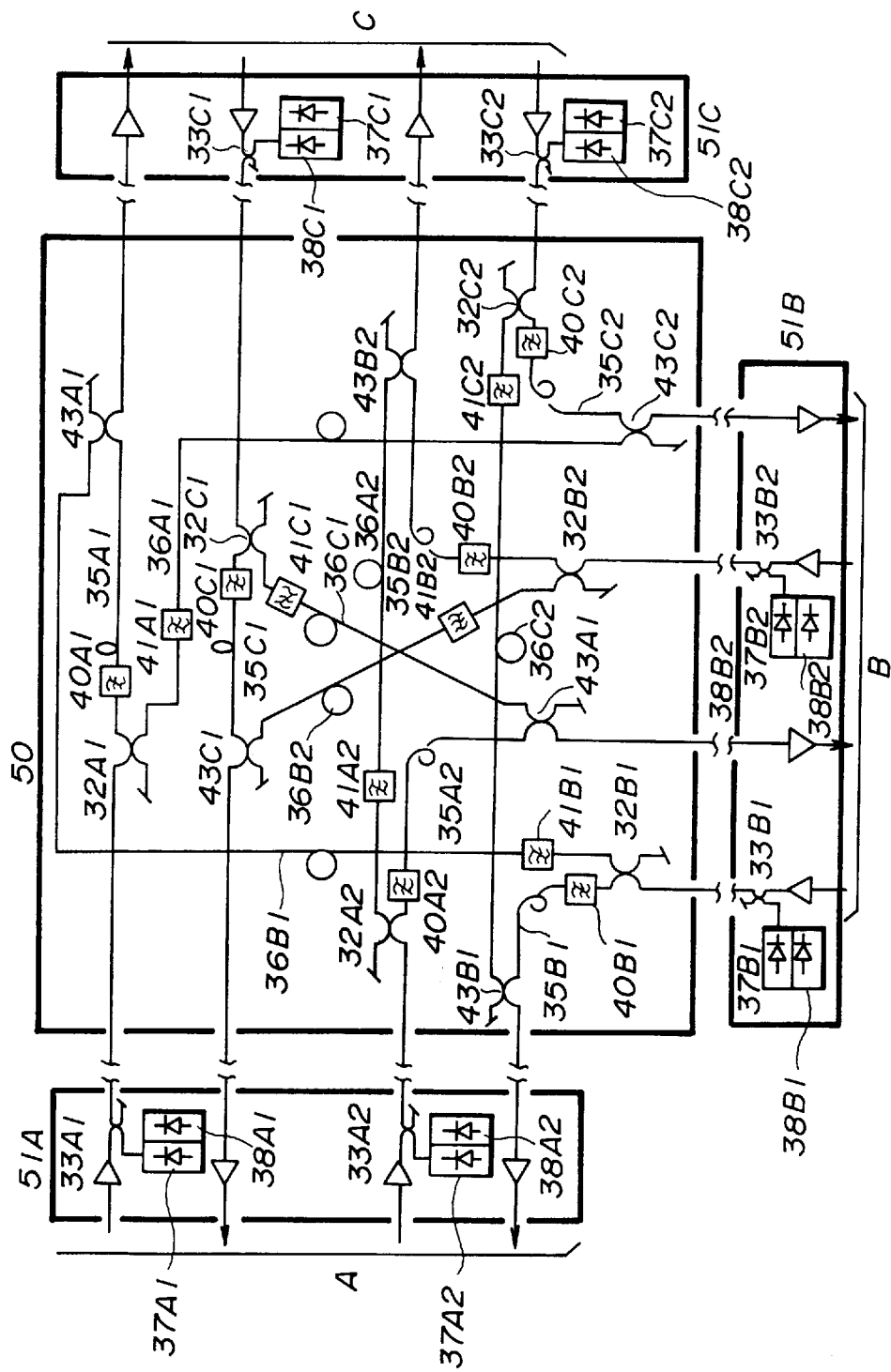
FIG. 8 is a diagram of a fourth embodiment of the present invention.

FIG. 8 shows a light signal switching device according to a fourth embodiment of the present invention. In FIG. 8, parts that are the same as those shown in FIG. 3 are given the same reference numbers. There are provided a branching part 50, and remote control parts 51A, 51B and 51C. The remote control part 51A includes the first pumping laser light sources 37A1 and 37A2 and the second pumping laser light sources 38A1 and 38A2. Further, the remote control part 51A includes the first photocouplers 33A1 and 33A2. The remote control part 51B includes the first pumping laser light sources 37B1 and 37B2 and the second pumping laser light sources 38B1 and 38B2. Further, the remote control part 51B includes the first photocouplers 33B1 and 33B2. The remote control part 51C includes the first pumping laser light sources 37C1 and 37C2 and the second pumping laser light sources 38C1 and 38C2. Further, the remote control part 51C includes the first photocouplers 33C1 and 33C2. Although the remote control parts 51A, 51B and 51C include respective drive controllers, an illustration of these controllers is omitted for the convenience' sake.

The remote control parts 51A, 51B and 51C are provided in the repeaters or terminal stations A, B and C in an optical transmission system, and are coupled to the second photocouplers 32A1, 32A2, 32B1, 32B2, 32C1 and 32C2 of the branching part 50 by means of optical fibers carrying light signals and exciting light.

The branching part 50 includes the first and second Er-doped optical fibers 35A1, 35A2, 35B1, 35B2, 35C1, 35C2, 36A1, 36A2, 36B1. 36B2, 36C1 and 36C2, the second photocouplers 32A1, 32A2, 32B1, 32B2, 32C1 and 32C2, the first and second optical filters 40A1, 40A2, 40B1, 40B2, 40C1, 40C2, 41A1, 41A2, 41B1, 41B2, 41C1 and 41C2, and the third photocouplers 43A1, 43A2, 43B1, 43B2, 43C1 and 43C2. That is, the branching parts 50 are made up of passive components only and there is no need to supply the branching part 50 with electrical power. If the remote control parts 51A, 51B and 51C that need supply of electrical power are provided in the repeaters, the repeaters have a structure for receiving electrical power, which can be used to drive the first and second pumping sources.

As in the case shown in FIG. 3, the stations A and C are coupled via the first Er-doped optical fibers 35A1 and 35C1 by driving the first pumping sources 37A1 and 37C1. The stations A and B are coupled via the first Er-doped optical fibers 35A2 and 35B1 by driving the first pumping sources 37A2 and 37B1. The stations B and C are coupled via the first Er-doped optical fibers 35B2 and 35C2 by driving the first pumping sources 37B2 and 37C2.

Figure 6:
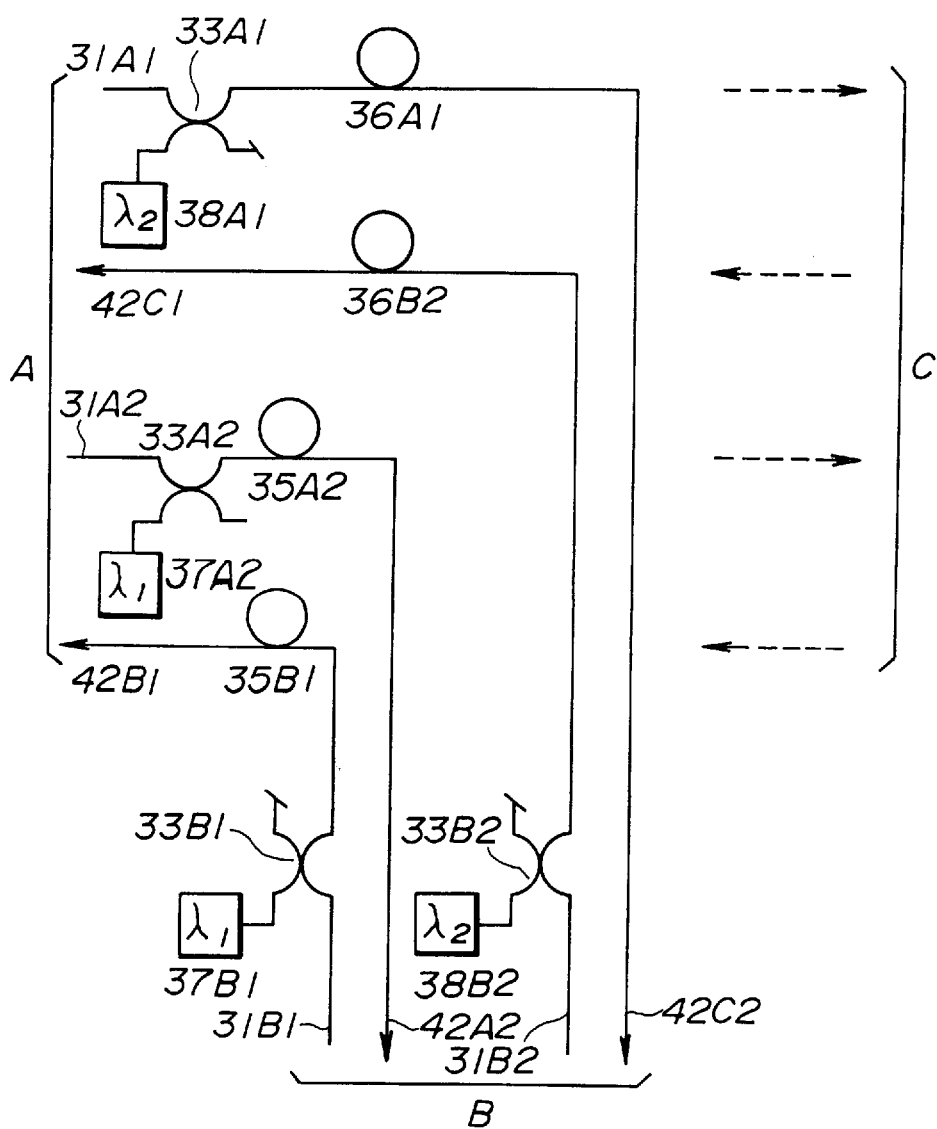
FIG. 6 is a diagram showing a connection which can be established by the third embodiment of the present invention when a fault occurs in a terminal station C.

If a fault occurs at the side of the station B, the second pumping sources 38A2 and 38C2 are driven instead of the first pumping sources 37A2 and 37C2. Hence, as shown in FIG. 5, an increased number of optical transmission paths can be obtained between the stations A and C. If a fault occurs at the side of the station C, the second pumping sources 38A1 and 38B2 are driven instead of the first pumping sources 37A1 and 37B2. Hence, as shown in FIG. 6, an increased number of optical transmission paths can be obtained between the stations A and B. If a fault occurs at the side of the station A, the second pumping sources 38B1 and 38C1 are driven instead of the first pumping sources 37B1 and 37C1. Hence, as shown in FIG. 7, an increased number of optical transmission paths can be obtained between the stations B and C.

Figure 9:
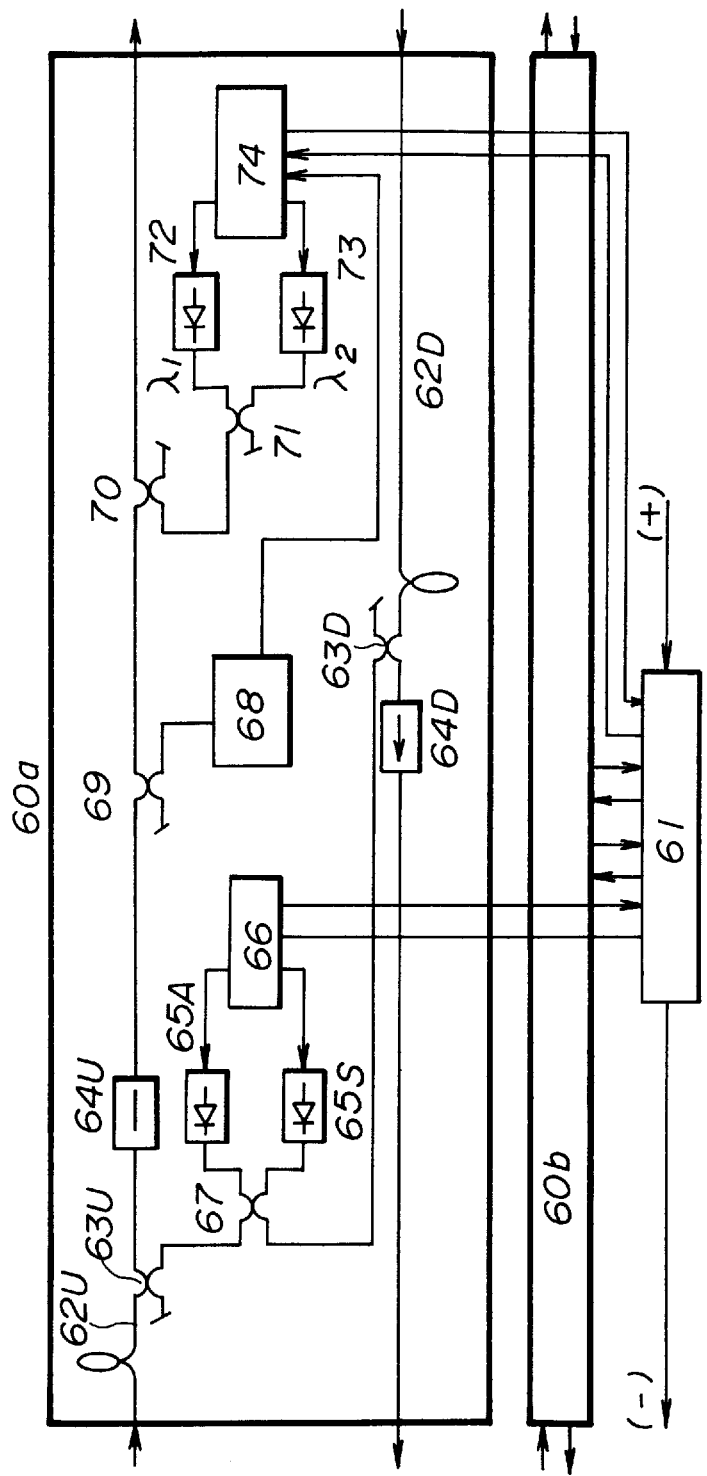
FIG. 9 is a diagram of a fifth embodiment of the present invention.

FIG. 9 shows a fifth embodiment of the present invention, and more particularly illustrates a part of each of the remote control parts 51A, 51B and 51C shown in FIG. 8. In FIG. 9, units 60$a$ and 60$b$ are provided having an identical structure, and a power supply circuit 61. The unit 60$a$ includes rare-earth-element doped optical fibers 62U and 62D (which are formed of Er-doped optical fibers in the following description), photocouplers 63U, 63D and 67, isolators 64U and 64D, pumping laser light sources 65A and 65B, a drive control circuit 66, a control signal receive and process circuit 68, photocouplers 69–71, a first pumping laser light source 72 generating an exciting light of wavelength $\lambda_1$ a second pumping laser light source 73 of wavelength, $\lambda_2$, and a control and drive circuit 74. The pumping sources 65A and 65B have an identical structure, and respectively function as working and protection sources.

The power supply circuit 61 is supplied with electricity from one of the terminal stations, and supplies the units 60$a$ and 60$b$ with electric power. The drive control circuit 66 drives either the pumping source 65A or the pumping source 65S or both, and applies the exciting light to the Er-doped optical fibers 62U and 62D. In this manner, the Er-doped optical fibers 62U and 62D amplify the light signal by the backward excitation. It is possible to excite the Er-doped optical fibers 62U and 62D backwardly. It is also possible to excite the Er-doped optical fibers 62U and 62D forwardly and backwardly.

The control signal receive and process circuit 68 converts a light component of the amplified light signal obtained by the Er-doped optical fiber 62U coming from the photocoupler 69 into an electric signal. Then, the control signal receive and process circuit 68 extracts a control signal superimposed on the main signal contained in the received electric signal (originally included in the light signal) and discriminates the extracted control signal. Then, the circuit 68 controls the drive control circuit 74. The control signal has a bit rate lower than that of the main signal, and can be transmitted by an appropriate one of the known conventional superimposing means.

The drive control circuit 74 drives either the first pumping source 72 or the second pumping source 73 according to the control signal supplied from the control signal receive and process circuit 68. For example, in the normal state, the first pumping source 72 is driven. In this case, the exciting light of the wavelength $\lambda_1$ is sent via the photocoupler 70 together with the light signal. In the branching part 50 shown in FIG. 8, the light signal is amplified by the first Er-doped optical fiber, while the light signal is attenuated by the second R-doped fiber. Hence, the connection shown in FIG. 4 can be established.

If the control signal for switching the transmission routes is sent from one of the terminal stations, the control signal receive and process circuit 68 receives the above control signal. Then, the circuit 68 controls the drive control circuit 74 to stop the operation of the first pumping source 72 and drive the second pumping source 73. For example, when the second pumping source 38A of the remote control part 51 shown in FIG. 8 is driven, the light signal is amplified by the second Er-doped optical fiber 36A1 in the branching part 50. Thus, the light signal transmitted to the terminal C is switched so as to be transmitted to the terminal B.

Figure 10:
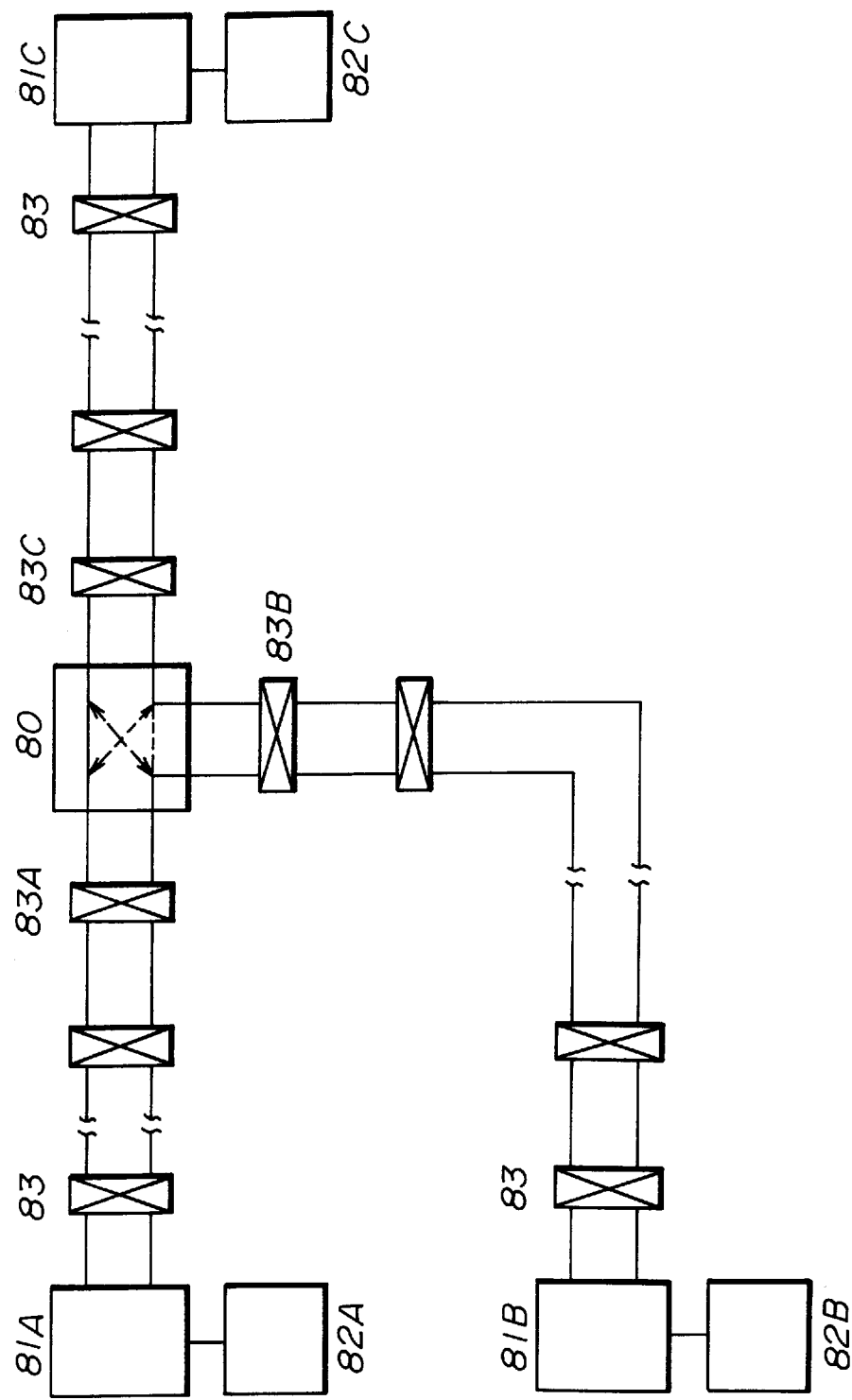
FIG. 10 is a diagram of a sixth embodiment of the present invention.

FIG. 10 shows an optical communication system according to a sixth embodiment of the present invention. The system includes a branching part 80, terminal stations 81A, 81B and 81C, pumping remote control parts 82A, 82B and 82C, and repeaters 83. The repeaters closest to the branching part 80 are indicated by reference numbers 83A, 83B and 83C. In the normal state, the terminal stations 81A, 81B and 81C are connected by routes depicted by solid lines.

For example, if the terminal station 81A detects a breakdown of the light signal from the terminal station 81B or a degradation of the error ratio, the terminal station 81A serially designates the terminal stations 81A and 81B and performs a loop-back test. In the terminal station 81A, it is determined whether a fault is detected by the loop-back test. Due to the results of the above determination, the position at which the fault occurs is disconnected. For example, if a fault occurs between the branching part 80 and the terminal station 81B or occurs in the terminal station 81B, the pumping remote control part 82A connected to the terminal station 81A sends the control signal which causes the route between the terminal stations A and C to be established instead of the route between the terminal stations A and B. The above control signal is superimposed on the main signal in the terminal station 81A, which sends the resultant light signal to the network.

Each of the repeaters 83A, 83B and 83C closest to the branching part 80 is equipped, as shown in FIG. 9, with the control signal receive and process circuit 68 and the first and second pumping laser light sources 72 and 73. The control signal receive and process circuit 68 receives and discriminates the control signal from the pumping remote control part 82A, and switches the working pumping source from the first source 72 to the second source 73. Hence, the transmission route is switched in the branching part 80 so that the transmission route between the terminal stations 81A and 81C is established instead of the transmission route between the terminal stations 81A and 81B.

If the fault at the side of the terminal station 81B is recovered, the pumping remote control part 82A sends the control signal which causes the branching part 80 to perform a switch-back operation. The above control signal is superimposed on the main signal and is sent to the network as a light signal. In the repeater 83A the above control signal is extracted and discriminated, Then, the operation of the second pumping source 73 is stopped and the first pumping source 72 is restarted. Hence, the transmission route in the branching part 80 is switched so that the original route is formed again.

It is possible to perform the detection of occurrence of a fault and the remote control of the branching part 80 automatically in the terminal stations 81A, 81B and 81C. For example, the functions of a management apparatus provided in an optical transmission system are utilized. More particularly, the management apparatus monitors the states of transmissions of light signals, and performs the fault point disconnecting operation if a fault is detected. Then, the management apparatus instructs the wavelength of the exciting light applied to the branching part 80 to be switched based on the position in which the fault occurs. In this manner, the transmission route can be switched in the branching part 80. If the recovery of the fault is detected, the wavelength of the exciting light is switched to the original so that the transmission route is returned to the original state.

When the optical transmission system does not have the repeaters 83 between the branching part and the terminal stations 81A, 81B and 81C, the terminal stations 81A, 81B and 81C are respectively equipped with the remote control parts 51A, 51B and 51C (FIG. 8). The pumping remote control parts 82A, 82B and 82C control the switching between the first and second pumping sources.

The present invention is not limited to the specifically disclosed embodiments. For example, the present invention includes an optical transmission system in which four terminal stations or more are connected by optical fibers via branching parts. It is also possible to use the first and second pumping sources as working and protection sources, i.e., one pumping source could be in the operational mode and the other pumping source could be in the standby mode. In this case, the reliability of the system can be highly improved.

The present invention is not limited to the specifically disclosed embodiments, and variations and modifications may be made without departing from the scope of the invention.

What is claimed is:

1. A light signal switching device including an input optical fiber through which a light signal is received, said light signal switching device comprising:

first and second output optical fibers each being doped with a rare-earth element;

first and second pumping sources inputting first and second excitation light to the first and second output optical fibers; and a drive controller driving the first and second pumping sources so that one of the first and second excitation light is applied to one of the first and second output optical fibers through which the light signal received from the input optical fiber is output.

2. The light signal switching device according to claim 1, further comprising photocouplers which couple the first and second pumping sources to the first and second output optical fibers.

3. A light signal switching device including an input optical fiber through which a light signal is received, said light signal switching device comprising:

first and second output optical fibers each being doped with a rare-earth element;

first and second pumping sources inputting first and second excitation light to the first and second output optical fibers;

a first photocoupler coupling the first and second pumping sources with the input optical fiber;

a second photocoupler coupling the input optical fiber with the first and second output optical fibers;

a first optical filter provided between the second photocoupler and the first output optical fiber;

a second optical filter provided between the second photocoupler and the second output optical fiber; and a drive controller selectively driving one of the first and second pumping sources.

4. The light signal switching device as claimed in claim 3, wherein:

the first and second pumping sources respectively generate the first and second excitation light of wavelengths $\lambda_1$ and $\lambda_2$; and the first and second optical fibers respectively reject light of wavelengths $\lambda_2$ and $\lambda_1$.

5. A light signal switching device performing switching among first, second and third routes for transmitting light signals, said light signal switching device comprising:

first photocouplers;

first and second pumping sources coupled, via the first photocouplers, to each of input optical fibers respectively forming the first, second and third routes, the first and second pumping sources generating first and second excitation light of different wavelengths;

second photocouplers coupled to each of the input optical fibers;

first and second output optical fibers coupled to the second photocouplers via optical filters, the first and second output optical fibers being doped with a rare-earth element;

third photocouplers coupling the second output optical fibers with the first optical fibers extending in routes different from routes of the second output optical fibers; and a drive control part which selectively drives the first and second pumping sources.

6. An optical transmission system comprising:

first, second and third communication devices;

first photocouplers;

first and second pumping sources provided, via the first photocouplers, to each of input optical fibers respectively extending from the first, second and third communication devices, the first and second pumping sources generating first and second excitation light of different wavelengths;

second photocouplers coupled to each of the input optical fibers;

first and second output optical fibers coupled to the second photocouplers via optical filters, the first and second output optical fibers being doped with a rare-earth element;

third photocouplers coupling the second output optical fibers with the first optical fibers extending to communication devices different from those of the second output optical fibers; and a drive control part which selectively drives the first and second pumping sources.

7. A light signal switching device comprising:

a coupler causing an input light signal to branch into two light signals;

first and second output optical fibers doped with a rare-earth element, the first and second output optical fibers respectively amplifying the two light signals;

a pumping source outputting excitation light of first and second wavelengths;

a first filter which is arranged between the first output optical fiber and the pumping source and which allows the excitation light of the first wavelength to be applied to the first output optical fiber; and a second filter which is arranged between the second output optical fiber and the pumping source and which allows the excitation light of the second wavelength to be applied to the second output optical fiber.

* * * * *